US008028590B2

(12) United States Patent
Tanaka

(10) Patent No.: US 8,028,590 B2
(45) Date of Patent: Oct. 4, 2011

(54) TRACTION APPARATUS AND TRACTION FORCE CONTROL METHOD OF TRACTION APPARATUS

(75) Inventor: Noboru Tanaka, Tokyo (JP)

(73) Assignee: Ito Co., Ltd., Tokyo (JP)

( * ) Notice: Subject to any disclaimer, the term of this patent is extended or adjusted under 35 U.S.C. 154(b) by 537 days.

(21) Appl. No.: 12/300,855

(22) PCT Filed: May 28, 2007

(86) PCT No.: PCT/JP2007/060798

§ 371 (c)(1),
(2), (4) Date: Nov. 14, 2008

(87) PCT Pub. No.: WO2007/139053

PCT Pub. Date: Dec. 6, 2007

(65) Prior Publication Data

US 2009/0264804 A1 Oct. 22, 2009

(30) Foreign Application Priority Data

May 30, 2006 (JP) ................................ 2006-149717

(51) Int. Cl.
*G01L 1/26* (2006.01)

(52) U.S. Cl. .................................... 73/862.393; 602/33

(58) Field of Classification Search .................... 73/826, 73/862.393; 602/33–35
See application file for complete search history.

(56) References Cited

U.S. PATENT DOCUMENTS 3,654,920 A * 4/1972 Staib ............................ 606/243
4,444,179 A * 4/1984 Trippi ............................ 602/37
5,092,322 A * 3/1992 Gantz ............................ 602/35
5,233,139 A * 8/1993 Hofmann ...................... 187/393
5,441,480 A * 8/1995 Kane et al. ...................... 602/36
5,850,616 A * 12/1998 Matsuno et al. ................ 701/82
5,865,781 A * 2/1999 Lieber et al. .................... 602/32
6,012,011 A * 1/2000 Johnson .......................... 701/82
7,143,843 B2 * 12/2006 Doering et al. ................ 175/24
2010/0069810 A1 * 3/2010 Tanaka ............................ 602/32

FOREIGN PATENT DOCUMENTS

JP 59-118156 7/1984
JP 06-056388 A 3/1994
JP 7-13312 3/1995
JP 2003-088540 3/2003
JP 3101454 6/2004
JP 2005-074086 3/2005

* cited by examiner

OTHER PUBLICATIONS

Japanese Office Action issued May 24, 2011, for corresponding Japanese Appin. No. 2006-149717.

*Primary Examiner* — Max Noori
(74) *Attorney, Agent, or Firm* — K&L Gates LLP

(57) ABSTRACT

In the traction apparatus, a control circuit has the following traction control process portions. First, a first traction control process portion winds up the slack portion of a wire by a motor to eliminate the slack of the wire connected to a body to be pulled. Next, a second traction control process portion converts a set traction force that is set by an operation portion to a traction amount to calculate a converted value and, by defining a predetermined amount of a traction amount set based on the converted value as an initial target value, continuously winds up the wire by the motor to that target value. Next, a third traction control process portion detects the traction force that is being applied to the body to be pulled by a load cell, calculates a drive stop time of the motor by defining the set traction force as a final target value on the basis of a detected output of the load cell and drives the drive mechanism, and stops the driving of the motor at a point of reaching the drive stop time.

2 Claims, 6 Drawing Sheets

TRACTION APPARATUS AND TRACTION FORCE CONTROL METHOD OF TRACTION APPARATUS

CROSS REFERENCE TO RELATED APPLICATIONS

The present application claims priority to Japanese Patent Application No. 2006-149717, filed May 30, 2006, the entire contents of which is being incorporated herein by reference.

BACKGROUND

The present disclosure relates to a traction apparatus and a traction force control method of a traction apparatus that is used for traction that is performed in manual therapeutics, orthopedics and the like.

As a conventional traction apparatus of this type, there has been proposed a sitting traction apparatus that includes a sling device for slinging up the underarms of a patient and a seat portion that has a fixture for fixing the thighs, and by hoisting the seat portion (upper half of the patient's body) vertically, treats the lumbar and the like (for example, refer to Japanese Unexamined Patent Application, First Publication No. 2003-88540).

Also, as a conventional traction apparatus, there has been proposed a traction apparatus that has a load cell which detects traction force, and detects the traction force so as to use the detection signal for drive control of a motor that is a drive source of the traction force (for example, refer to Japanese Unexamined Patent Application, First Publication No. S59-118156).

However, although the traction apparatus disclosed in Japanese Unexamined Patent Application, First Publication No. 2003-88540 is an apparatus that hoists the upper half of a patient's body by winding up a rope with a motor, there is no specific disclosure regarding the traction control of the motor.

The traction apparatus that is disclosed in Japanese Unexamined Patent Application, First Publication No. S59-118156 is constituted so as to control the traction force with feedback control by detecting traction force with the load cell. In the feedback control, a time lag occurs due to the response time of the load cell as a traction force sensor, the delay time of the feedback circuit, and the like. Accordingly, in such a traction apparatus as shown in FIG. 7, there is the problem that at time $t_i$ when the detection value that is detected by the load cell has reached a set traction force (target value) $F_0$, the traction force that is actually applied to the body to be pulled (actual value) temporarily leads to over-traction.

In order to reduce this over-traction, as shown in FIG. 8, it has been conceived to perform feedback control while the traction apparatus increasing the traction force intermittently and gradually. In this case, the traction apparatus first pulls with a traction force of for example approximately $\frac{1}{7}$th of the set traction force $F_0$ and maintains that traction force. Next, the traction apparatus gradually raises the traction force to approximately $\frac{2}{7}$th of the set traction force $F_0$ at the point of the detection value from the load cell having stabilized, and maintains that traction force. After that, the transaction apparatus again gradually raises the transaction force at the point of the detection value from the load cell having stabilized. The traction apparatus repeats this control until finally pulling the body to be pulled with the set traction force $F_0$. With this kind of feedback control, as shown in FIG. 8, the error between the load cell detection value and the actual traction force (actual value) becomes small, and an over-traction force is prevented from being applied to the body to be pulled. However, with this method, the problem arises that it takes time until reaching the set traction force $F_0$ that is the target value. Also, in the case where the body to be pulled is a human body, there is also the problem that the sense of use is uncomfortable since the traction force changes in small increments.

SUMMARY

The present embodiments have been conceived in view of the above circumstances, and has as its object to provide a traction apparatus and a traction force control method for a traction apparatus capable of preventing over-traction being applied to a body to be pulled and capable of promptly and smoothly applying traction force that has been set.

In order to achieve the above object, the traction force control method according to an embodiment is for a traction apparatus that applies to a body to be pulled a desired traction force via a traction mechanism that includes a fixture and a wire, and includes: a first traction control step of winding up a slack portion of the wire by a drive mechanism to eliminate slack of the wire connected to the body to be pulled; a second traction control step of converting a set traction force set by an operation portion to a traction amount to calculate a converted value and, by defining a predetermined amount of a traction amount set based on the converted value as an initial target value, winding up the wire continuously by the drive mechanism to the initial target value; and a third traction control step of calculating a drive stop time of the drive mechanism by defining the set traction force as a final target value based on a detected output of a traction force sensor that detects the traction force that is applied to the body to be pulled and driving the drive mechanism, and stopping driving of the drive mechanism at a point of reaching the drive stop time.

Moreover, the traction apparatus according to an embodiment applies a desired traction force to a body to be pulled, and includes: an operation portion that sets a traction force to be applied to the body to be pulled; a traction mechanism that includes a fixture that is attached to the body to be pulled and a wire that is connected to the fixture, and applies traction force to the body to be pulled; a drive mechanism that winds up the wire; a traction force sensor that detects a traction force acting on the wire; and a control circuit that fetches a set output of a set traction force that is set by the operation portion and a detected output of the traction force sensor and controls driving of the drive mechanism, the control circuit including: a first traction control process portion that winds up a slack portion of the wire by the drive mechanism to eliminate slack of the wire connected to the body to be pulled, a second traction control process portion that converts the set traction force to a traction amount to calculate a converted value and, by defining a predetermined amount of a traction amount set based on the converted value as an initial target value, winds up the wire continuously by the drive mechanism to the target value, and a third traction control process that calculates a drive stop time of the drive mechanism by defining the set traction force as a final target value based on the detected output of the traction force sensor and drives the drive mechanism, and stops driving of the drive mechanism at a point of reaching the drive stop time.

Accordingly, according to the traction control method and traction apparatus according to an embodiment, first a first traction control process is executed that winds up the slack of the wire in order to raise the accuracy of the conversion of the traction amount and the traction force. Next, the second traction control process is executed that performs control so as to increase the traction force until a traction force of a value close to the target value is applied to the body to be pulled without performing feedback control. Next, the third traction control process is performed so as to stop the driving of the motor that is the drive mechanism at the point of finally reaching the traction force that is the target value. By these traction force control processes, it is possible to prevent over-traction force being applied to a body to be pulled and possible to promptly and smoothly apply traction force that is the target value.

As explained above, according to the embodiments, it is possible to prevent over-traction force being applied to a body to be pulled and possible to promptly and smoothly apply traction force that is the target value.

Additional features and advantages are described herein, and will be apparent from, the following Detailed Description and the figures.

DETAILED DESCRIPTION

Figure 1:
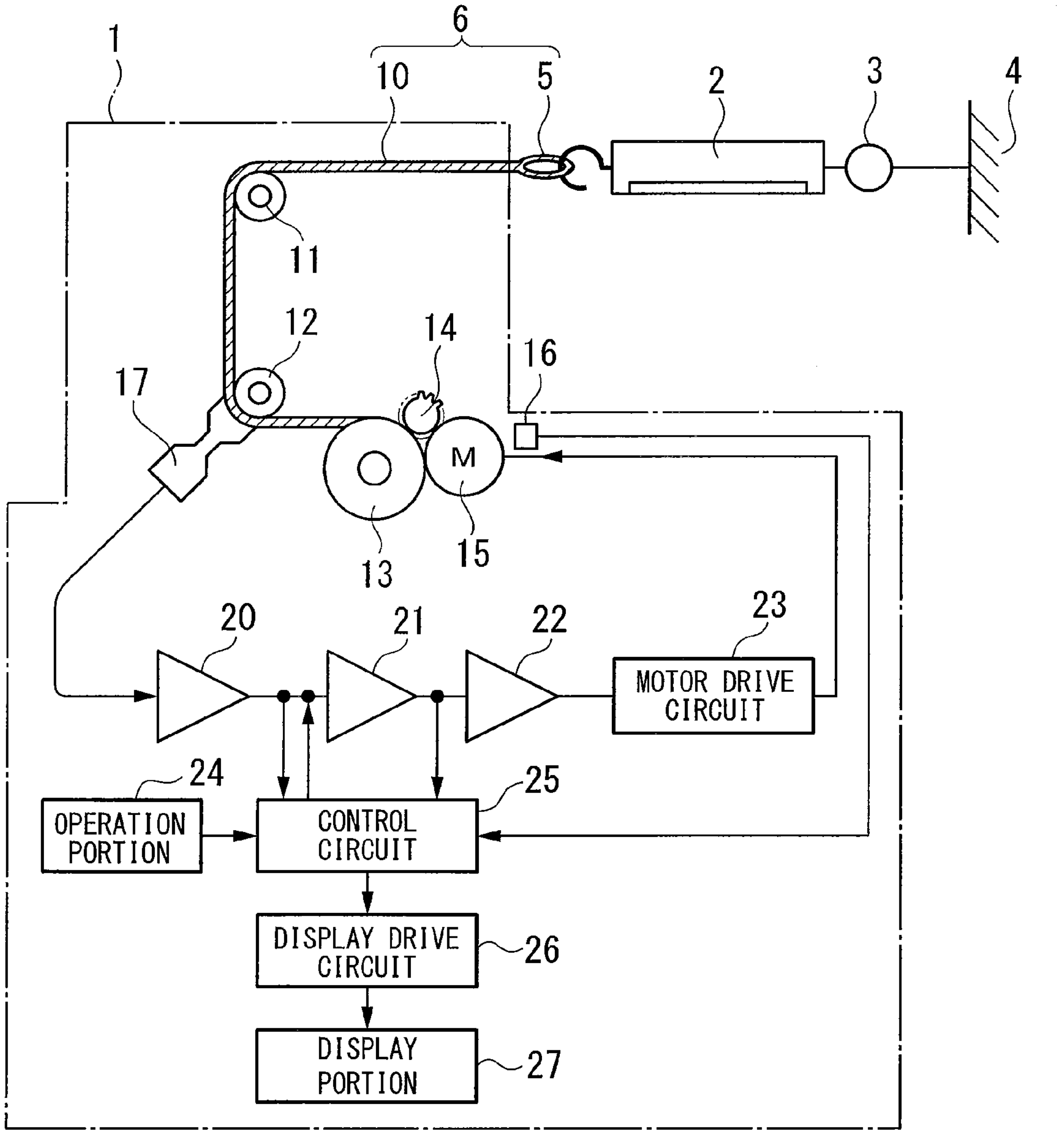
FIG. 1 is a diagram showing the overall schematic constitution of a traction apparatus according to an embodiment.

Hereinbelow, an embodiment will be described with reference to the drawings. FIG. 1 shows the schematic constitution of the traction apparatus according to the embodiment. In FIG. 1, a traction apparatus 1 according to the present embodiment is connected to a fixing portion 4 by a wire 10 via a fixture 3 and a body to be pulled 2. The body to be pulled 2 is an elastic body, and in FIG. 1 is illustrated schematically, but may for example be a human body.

The traction apparatus 1 has an operation portion 24, a traction mechanism 6, a motor (drive mechanism) 15, a load cell (traction force sensor) 17, and a control circuit 25. The control portion 24 sets the traction force to be applied to the body to be pulled 2. The traction mechanism 6 includes a fixture 5 that is attached to the body to be pulled 2 and a wire 10 that is connected to the fixture 5. The traction mechanism 6 applies traction force to the body to be pulled 2. The motor 15 winds up the wire 10. The load cell 17 detects the traction force that acts on the wire 10. The control circuit 25 fetches the set output of the traction force that is set by the operation portion 24 and the detected output of the load cell 17 and controls the driving of the motor (drive mechanism) 15.

The wire 10 is rolled up by a take-up roller 13 via the pulleys 11 and 12. The drive force is the rotative force of the motor 15, and is transmitted to the rotation axis of the take-up roller 13 via the deceleration mechanism 14.

The rotation number detector 16 is a detector that detects the number of rotations rotated by the motor. The detected output of the rotation number detector 16 is input to the control circuit 25.

The traction apparatus 1 also has a direct-current amplifier 20, an adder 21, a PWM converter 22, a motor drive circuit 23, a display portion 27, and a display drive circuit 26. The direct-current amplifier 20 amplifies the detected output of the load cell 17. The adder 21 adds the output signal of the direct-current amplifier 20 and the control signal that is output from the control circuit 25. The PWM converter 22 outputs a pulse signal with a duty corresponding to the output level of the adder 21. The motor drive circuit 23 outputs a drive signal to the motor 15. The display drive circuit 26 drives the display portion 27.

The control signal 25 has the following traction control process portions. First, a first traction control process portion winds up the slack portion of the wire 10 by the motor 15 to eliminate the slack of the wire 10 connected to the body to be pulled 2. Next, a second traction control process portion converts a set traction force that is set by the operation portion 24 to a traction amount to calculate a converted value and, by defining a predetermined amount of a traction amount set on the basis of the converted value as an initial target value, continuously winds up the wire 10 by the motor 15 to the initial target value. Next, a third traction control process portion detects the traction force that is being applied to the body to be pulled 2 by the load cell 17, calculates a drive stop time of the motor 15 by defining the set traction force as a final target value on the basis of a detected output of the load cell 17 and drives the drive mechanism, and stops the driving of the motor 15 at the point of reaching the drive stop time.

The operation portion 24 is constituted by a plurality of keys. The display portion 27 performs display of the key functions of the operation portion 24, the treatment mode, various parameters, traction force, and errors and the like.

Figure 2:
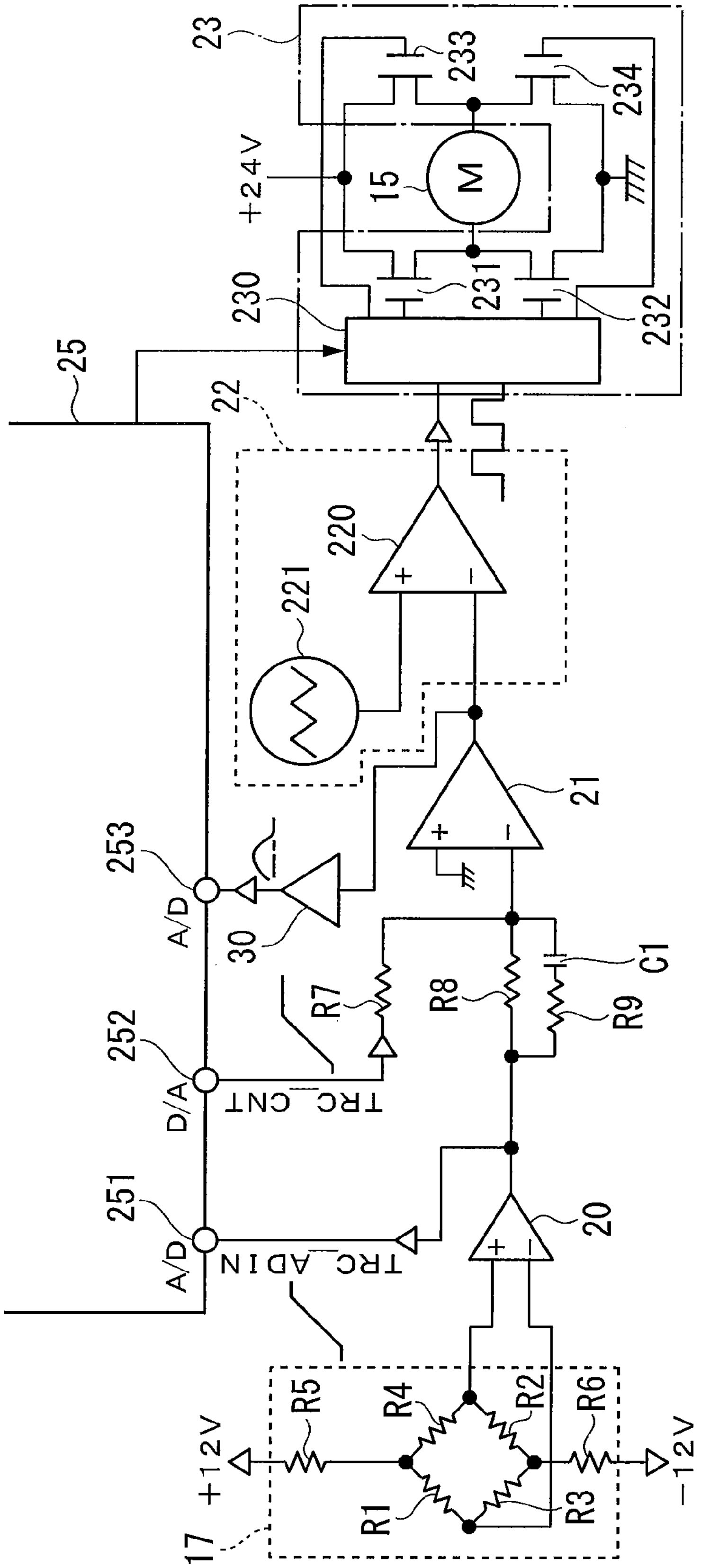
FIG. 2 is a circuit diagram showing the specific constitution in the main portions of the traction apparatus according to the embodiment shown in FIG. 1.

Next, FIG. 2 shows a specific constitution that relates to traction control in the traction apparatus shown in FIG. 1. In FIG. 2, elements that are the same as those shown in FIG. 1 are denoted by the same reference symbols, and redundant explanations are omitted.

In FIG. 2, the load cell 17 has a bridge circuit that is formed by resistors R1, R2, R3, R4, and resistors R5, R6. A power supply voltage is impressed on the bridge circuit via the resistors R5, R6. When a traction force acts on the wire 10, the balance of the bridge circuit is upset, and a direct-current voltage of a level corresponding to the magnitude of the traction force is output.

The direct-current amplifier 20 inputs the signal TRC_ADIN that is generated by amplifying the output of the bridge circuit, that is, the detected output of the load cell 17, to terminal 251 of the control circuit 25.

In the adder 21, a control output TRC_CNT that corresponds to the traction force that is set by the operation portion 24 from the terminal 252 of the control circuit 25 and the signal TRC_ADIN are added. The addition output is input to a terminal 253 of the control circuit 25, and is input to an inverting input terminal of a comparator 220 that constitutes the PWM converter 22.

On the other hand, a triangular wave signal that is output from a triangular wave generator 221 is input to the non-inverting terminal of the comparator 220. This triangular wave signal and the output of the adder 21 are compared by the comparator 220, whereby a pulse signal of a duty that corresponds to the output level of the adder 21 is output to the motor drive circuit 23.

In the motor drive circuit 23, for example a voltage of +24V is impressed across both terminals of the motor 15 via switching elements 231, 233. Both terminals of the motor 15 are grounded via switching elements 232, 234. The switching elements 231 to 234 are ON/OFF controlled so that the motor 15 rotates in the forward or reverse direction based on the control signal that is output from the control circuit 25. That is, the control signal that is output from the control circuit 25 is input to the motor drive circuit 230, and an output signal of the comparator 220 is output to the gate of a specified switching element among the switching elements 231 to 234.

Figure 3:
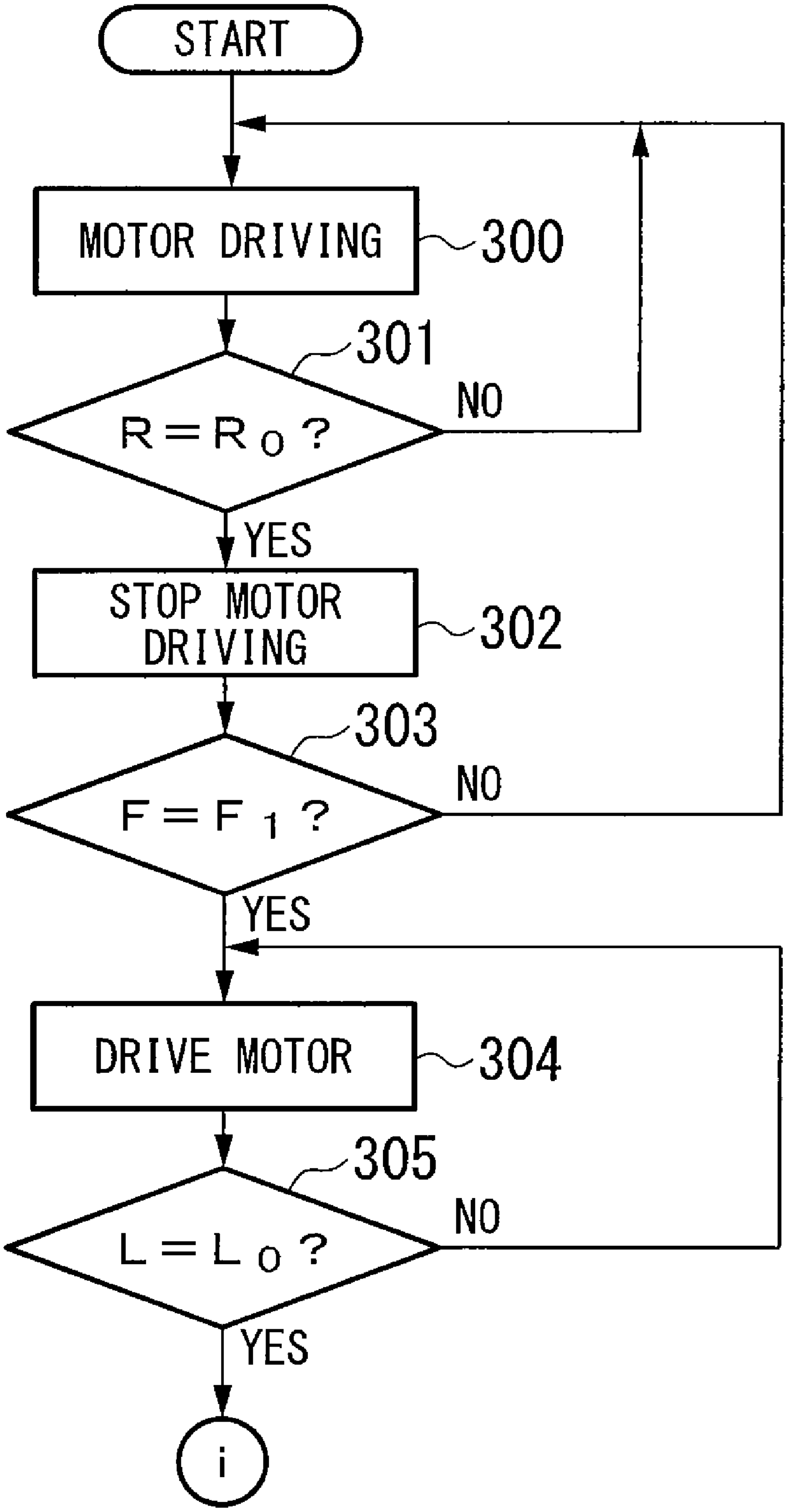
FIG. 3 is a flowchart showing the operation of the traction apparatus according to the embodiment shown in FIG. 1.
Figure 4:
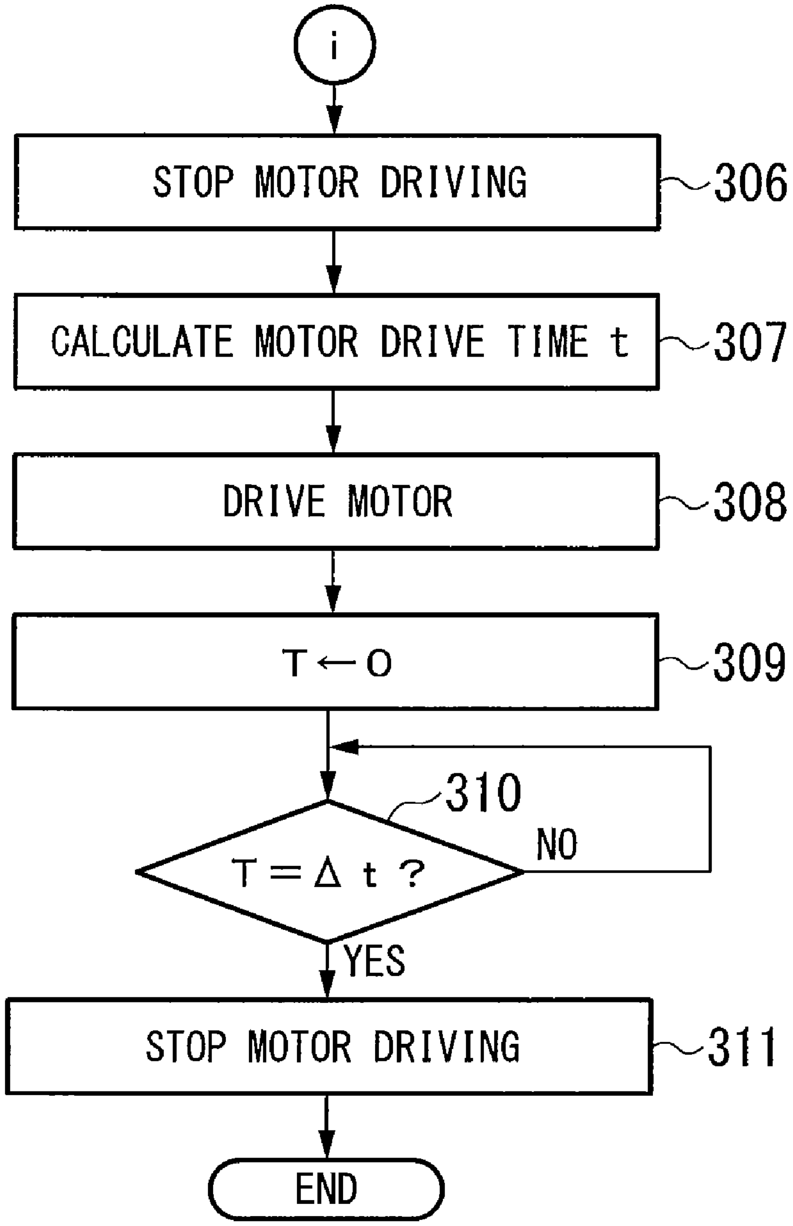
FIG. 4 is a flowchart showing the operation of the traction apparatus according to the embodiment shown in FIG. 1.

The operation of the traction apparatus with the above constitution will be described with reference to the flowcharts of FIG. 3 and FIG. 4. In FIG. 3 and FIG. 4, when a traction force that serves as the desired target value is set by the user using the operation portion 24, and a switch is operated in order to start the traction operation, the motor 15 is driven (Step 300). Next, based on the detection output of the rotation number detector 16, it is judged whether or not rotation number R that the motor 15 has rotated is $R=R_0$ ($R_0$ being the number of rotations rotated that corresponds to the traction amount during initial traction) (Step 301). In the case of the judgment of Step 301 being "NO", the process returns to Step 300, and the rotation driving of the motor 15 is continued.

Also, in the case of the judgment of Step 301 being "YES", the driving of the motor 15 is stopped (Step 302). Next, it is judged whether the traction force F has become $F=F_1$ (Step 303). That is, it is determined whether or not the traction force F that is applied to the body to be pulled 2 has reached a traction force $F_1$ that is sufficient for winding up the slack portion of the wire 10. This traction force $F_1$ is in the present embodiment set to for example 5 kg. In the case of the judgment of Step 303 being "NO", the process returns to Step 300. By doing so, in order to wind up the slack portion of the wire 10, the motor 15 is rotated a little and then stopped, with this operation being repeated until the traction force F becomes $F=F_1$.

These Steps 300 to 303 constitute the first traction control process.

Figure 5:
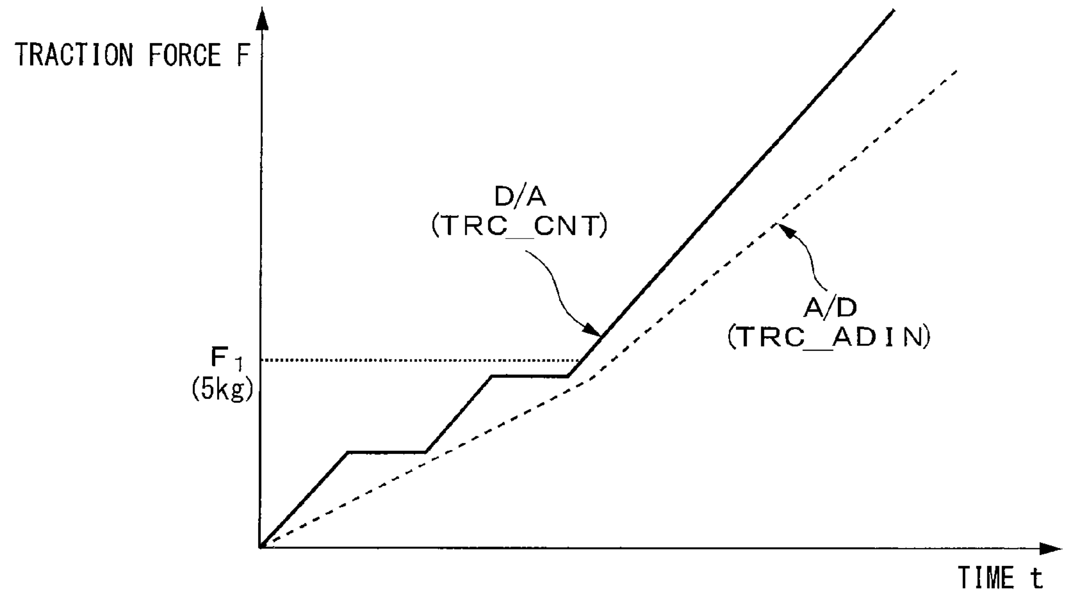
FIG. 5 is a diagram showing an example of the control characteristic during the initial traction of the traction apparatus according to another embodiment.

Here, the above traction force control repeatedly rotates the motor a little, stops it, and judges whether or not the traction force has reached the predetermined traction force $F_1$. As another method, in the initial traction directly after the start of the traction force control as shown in FIG. 5, the below traction force control may be performed for traction until the traction force $F_1$ (5 kg) sufficient for winding up the slack portion of the wire 10. First, the control output TRC_CNT is raised. Next, the control output TRC_CNT of the control circuit 25 and the output signal TRC_ADIN of the direct-current amplifier 20 are compared, and in the case of the difference being 2 kg or more, increase of the control output TRC_CNT of the control circuit 25 is stopped. Then, when the difference in this traction force is within 1 kg, the increase in the control output TRC_CNT is resumed. These traction force controls are repeated until the traction force reaches $F_1$.

On the other hand, in the case of the judgment of Step 303 being "YES", the first traction force control process is stopped, and the processing proceeds to the second traction force control process that causes the traction force to actually act on the body to be pulled 2.

That is, the driving of the motor is resumed (Step 304). Next, it is judged whether or not the traction amount L has reached $L=L_0$ ($L_0$ is in the present embodiment for example 75% of the value that coverts the traction force $F_i$ that is the target value to a traction quantity) (Step 305). In this judgment, the traction quantity is calculated based on the number of rotations detected by the rotation number detector 16. If the judgment of Step 305 is "NO", the processing returns to Step 304, and if "YES", it proceeds to the next step.

Although the outline of the second traction force control process is as described above, Step 305 may be judged by traction force instead of traction amount. Hereinbelow, a specific operation that judges with traction force will be described.

Figure 6:
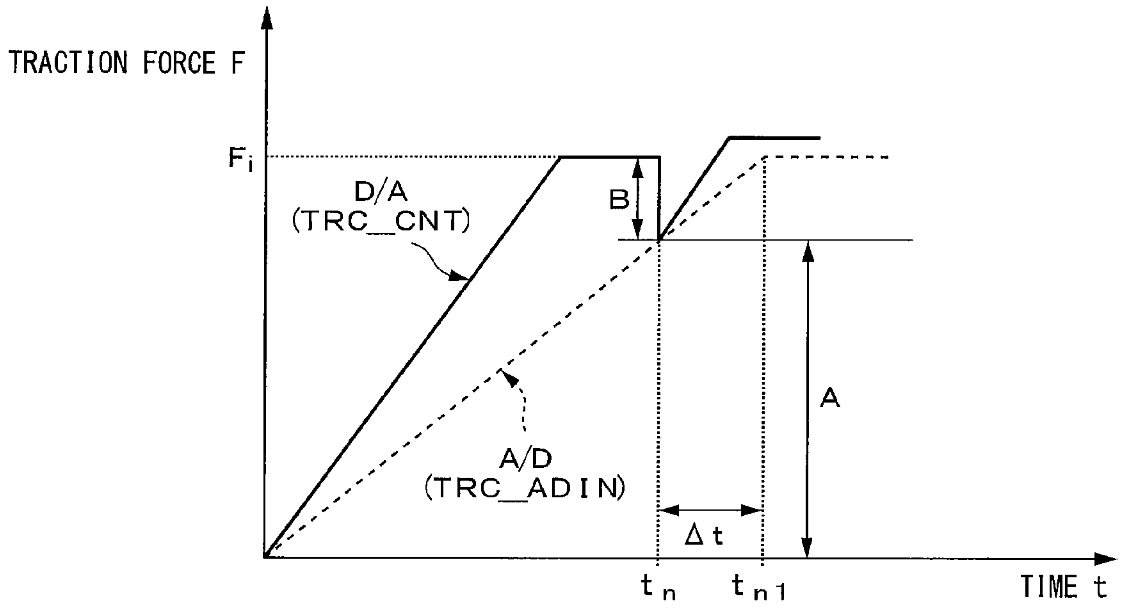
FIG. 6 is a diagram showing an example of the traction control characteristics of the traction apparatus according to the embodiment shown in FIG. 1.
Figure 7:
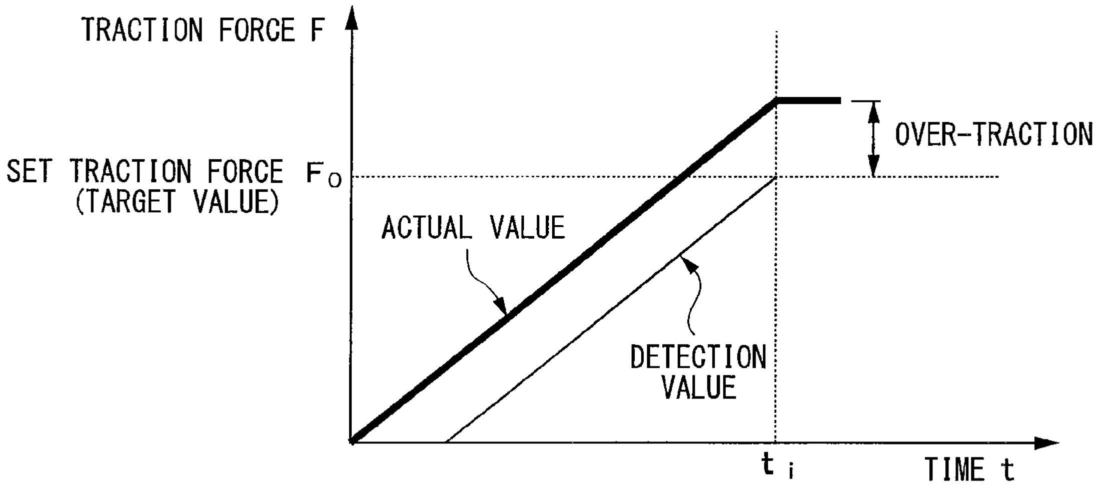
FIG. 7 is a diagram showing an example of the traction control characteristics of a conventional traction apparatus.
Figure 8:
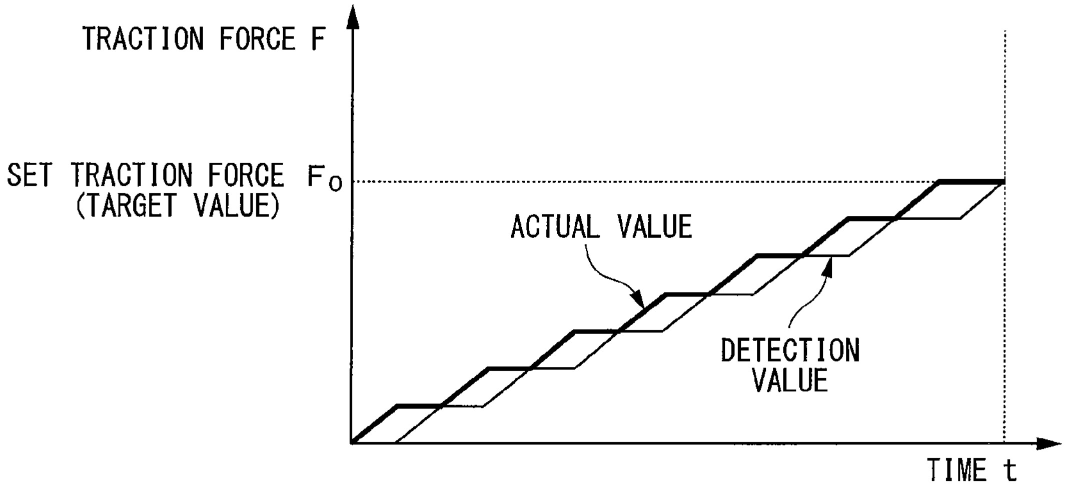
FIG. 8 is a diagram showing another example of the traction control characteristics of a conventional traction apparatus.

In the second traction force control process, as shown in FIG. 6, the control output TRC_CNT is raised at the set speed until the set traction force $F_i$. Once the control output TRC_CNT has reached the set traction force $F_i$, that value is maintained. Next, at the point $t_n$ where a transaction amount obtained by converting the output signal TRC_ADIN of the direct-current amplifier 20 reaches 75% of the set traction force $F_i$ (the point of A in FIG. 6), that is when the judgment of Step 305 is "YES", the value of the control output TRC_CNT is decreased to the level of 75% of the set traction force $F_i$ (the amount corresponding to B in FIG. 6).

From this position, the processing proceeds to the third traction force control process that raises the level of the control output TRC_CNT at a set traction speed. In this third traction force control process, control is performed that stops the traction by the motor 15 in the state of the traction force that is applied to the body to be pulled correctly made to agree with the set traction force $F_i$ that is a target value.

In this third traction process, first at time $t_n$, the driving of the motor 15 is stopped (Step 306). Next, based on the detected output of the of the load cell 17, the drive time Δt of the motor 15 required for the traction force that is applied to the body to be pulled 2 to reach the set traction $F_i$ is calculated (Step 307). Next, the motor 15 is driven and the timer T that times the drive time of the motor 15 is reset (Steps 308, 309). Next, it is determined whether or not the drive time T of the motor 15 has reached $T=\Delta t$ (Step 310). In the case of the drive time T of the motor 15 reaching $T=\Delta t$ at time $t_{n1}$, the driving of the motor 15 is stopped (Step 311).

As described above, the traction apparatus of the present embodiment first executes the first traction control step of winding up the slack of a wire in order to increase the accuracy of conversion of the traction amount and traction force. Next, it executes the second traction control step of performing control so as to increase the traction force until a traction force close to the target value is applied to the body to be pulled without performing feedback control. Next, it executes the third traction control process so as to stop the driving of the motor that is the drive mechanism at the point of finally reaching the traction force that is the target value. By these traction force control processes, it is possible to prevent over-traction force being applied to a body to be pulled and promptly and smoothly apply traction force that is the target value.

The present disclosure can be applied to a traction apparatus that is used in manual therapeutics, orthopedics and the like. According to the traction force control method of this traction apparatus, it is possible to prevent over-traction force being applied to a body to be pulled and promptly and smoothly apply traction force that is the target value.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A traction force control method for a traction apparatus that applies to a body to be pulled a desired traction force via a traction mechanism that includes a fixture and a wire, the method comprising:

a first traction control step of winding up a slack portion of the wire by a drive mechanism to eliminate slack of the wire connected to the body to be pulled;

a second traction control step of converting a set traction force set by an operation portion to a traction amount to calculate a converted value and, by defining a predetermined amount of a traction amount set based on the converted value as an initial target value, winding up the wire continuously by the drive mechanism to the initial target value; and a third traction control step of calculating a drive stop time of the drive mechanism by defining the set traction force as a final target value based on a detected output of a traction force sensor that detects the traction force that is applied to the body to be pulled and driving the drive mechanism, and stopping driving of the drive mechanism at a point of reaching the drive stop time.

2. A traction apparatus that applies a desired traction force to a body to be pulled, the traction apparatus comprising:

an operation portion that sets a traction force to be applied to the body to be pulled;

a traction mechanism that includes a fixture that is attached to the body to be pulled and a wire that is connected to the fixture, and applies traction force to the body to be pulled;

a drive mechanism that winds up the wire;

a traction force sensor that detects a traction force acting on the wire; and a control circuit that fetches a set output of a set traction force that is set by the operation portion and a detected output of the traction force sensor and controls driving of the drive mechanism, the control circuit including a first traction control process portion that winds up a slack portion of the wire by the drive mechanism to eliminate slack of the wire connected to the body to be pulled, a second traction control process portion that converts the set traction force to a traction amount to calculate a converted value and, by defining a predetermined amount of a traction amount set based on the converted value as an initial target value, winds up the wire continuously by the drive mechanism to the target value, and a third traction control process that calculates a drive stop time of the drive mechanism by defining the set traction force as a final target value based on the detected output of the traction force sensor and drives the drive mechanism, and stops driving of the drive mechanism at a point of reaching the drive stop time.

* * * * *